(12) United States Patent
Li et al.

(10) Patent No.: US 8,496,481 B2
(45) Date of Patent: Jul. 30, 2013

(54) TEACHING AND TRAINING HEAD MODEL FOR HAIRCUTTING AND HAIRDRESSING

(75) Inventors: Mingxian Li, Qingdao Jimo (CN);
Guangwei Fan, Qingdao Jimo (CN);
Jiankai Zhao, Qingdao Jimo (CN)

(73) Assignee: Qingdao Jifa Group Co., Ltd., Qingdao Jimo, Shandong Province (CN)

( * ) Notice: Subject to any disclaimer, the term of this patent is extended or adjusted under 35 U.S.C. 154(b) by 215 days.

(21) Appl. No.: 13/142,279

(22) PCT Filed: Jan. 26, 2010

(86) PCT No.: PCT/CN2010/070361
§ 371 (c)(1),
(2), (4) Date: Jun. 26, 2011

(87) PCT Pub. No.: WO2010/142151
PCT Pub. Date: Dec. 16, 2010

(65) Prior Publication Data
US 2011/0275039 A1    Nov. 10, 2011

(30) Foreign Application Priority Data

Dec. 21, 2009  (CN) .......................... 2009 1 0259592
Dec. 21, 2009  (CN) .......................... 2009 2 0293379

(51) Int. Cl.
*G09B 19/10*   (2006.01)
(52) U.S. Cl.
USPC ......................................................... 434/94
(58) Field of Classification Search
USPC ............ 434/86, 94, 262, 267, 270, 295, 296;
446/319, 337–339
See application file for complete search history.

(56) References Cited

U.S. PATENT DOCUMENTS

| | | | | |
|---|---|---|---|---|
| 4,170,085 A | * | 10/1979 | Luke | 446/319 |
| 4,246,722 A | * | 1/1981 | Sapkus et al. | 446/320 |
| 4,526,552 A | * | 7/1985 | Rhodes | 446/320 |
| 4,801,286 A | * | 1/1989 | Orenstein et al. | 446/319 |
| 5,586,696 A | * | 12/1996 | Martinez | 223/66 |
| 6,139,397 A | * | 10/2000 | Blau et al. | 446/319 |
| 7,063,590 B2 | * | 6/2006 | Ferrigno | 446/319 |
| 2008/0197159 A1 | | 8/2008 | Ottley | |

FOREIGN PATENT DOCUMENTS

| | | |
|---|---|---|
| CN | 100474356 C | 4/2009 |
| DE | 202005003134 U | 5/2005 |
| JP | 2003088421 A | 3/2003 |

* cited by examiner

*Primary Examiner* — Kurt Fernstrom
(74) *Attorney, Agent, or Firm* — Cheng-Ju Chiang

(57) ABSTRACT

A teaching and training head model for haircutting and hairdressing includes a soft and flexible synthetic resin casing, a shape keeping arrangement mounted in the casing to keep the shape of the casing and a support stand for supporting the shape keeping arrangement. The support stand includes: a base board; and a guiding bar, a pushing cylinder for lifting plates and a pressing cylinder which are centered about the center of the base board and sequentially positioned on the base board from inside to outside. A fixing ring for fixing the casing is provided at the periphery of the pressing cylinder. The shape keeping arrangement includes components fitted with the support stand and umbrella-shaped supporting components for supporting the casing. The shape keeping arrangement has a simple structure, and it will expand to keep the shape of the casing when the shape keeping arrangement mounted in the casing is inserted into the supporting stand. The shape keeping arrangement is simple to assemble.

5 Claims, 4 Drawing Sheets

TEACHING AND TRAINING HEAD MODEL FOR HAIRCUTTING AND HAIRDRESSING

CROSS REFERENCE TO RELATED APPLICATIONS

The present application is a 35 U.S.C. §371 National Phase conversion of International (PCT) Patent Application No. PCT/CN2010/070361, filed on Jan. 26, 2010, the disclosure of which is incorporated by reference herein. The PCT International Patent Application was published in Chinese.

TECHNICAL FIELD

This invention relates to the technical field of teaching aids, and in particular, relates to a teaching and training head model for haircutting and hairdressing for practice in teaching of barbers and beauticians in order to improve the skill or to obtain a relevant qualification.

BACKGROUND OF THE INVENTION

In order to improve technology for obtaining a relevant qualification or to practice exercises for learning skill, barbers and beauticians may use models with head and neck for practicing hairdressing, curling, drying, coloring, shaving, beauty, makeup and other exercises.

However, the previous head models are filled with a great amount of hard foaming agent in the leather, in order to keep the shape of the head model as made. Such head models have the following shortcomings: (1) as the shape can be changed no more, they have to be stored as they are. A large space will be needed if head models are many; (2) as their surface elasticity is not very good, they feel no sense of true skin of people; (3) as they can not be recovered after use, a great amount of refuse will be formed, whose incineration will pollute the environment; (4) an unstable foaming agent will lead to product defects, influencing the product quality.

The approved patent, whose register publication number is CN100474356C, discloses a head model for hair dressing and beauty, as shown in FIG. 1, including a soft-elastic synthetic resin casing 31, a support stand 32 which the casing 31 can be simply installed on or removed from and a component keeping arrangement 33 installed in the casing for keeping the shape of casing 31, wherein the support stand 32 is inserted into the through-hole in the center of the base board 32*a*, a support component 36 of the base board 32*a* is fixed on the base board, a fixing ring 34 is set inside the lower end of the casing 31, a fixing cylinder 35 and the fixing ring 34 set on the base board 32*a*, when they are clamped at the lower end of the casing 31, will squeeze an elastic squeezing ring 37, and a balloon as a component keeping arrangement 33 is also provided. An intake valve 38 and an outlet valve 39 are positioned on the balloon, both of which are check valves. The intake valve 38 opens for air inflow and closes after air inflow, and the outlet valve opens only in air outflow. When air is led in from the intake valve 38, the balloon used for a component keeping arrangement will be swelled, keeping the shape of the casing 31, and after air outflows from the outlet valve 39, it will be kept in a small box.

The head model described in the above-mentioned patent, as it uses a balloon for needing to keep the shape, needs an intake valve, outlet valve and air supply pipe, leading to a troublesome structure, time-consuming assembly, and the need of an air supply device for supply the air.

The head model described in the above-mentioned patent has another defect. Even if the balloon has been swelled, the aeration quantity cannot be controlled, and many sites of the balloon may not touch the face of the casing. A forceful pressing may lead to a sink in the internship and too much aeration may lead to head deformation.

SUMMARY OF THE INVENTION

This invention aims to provide a teaching and training head model for haircutting and hairdressing that uses mechanical joint structure, involves simple assembly, needs no very large space for storage and can be recycled.

To achieve the above-mentioned objective, the technical solution adopted in this invention is: a teaching and training head model for haircutting and hairdressing, includes a casing, a shape keeping arrangement mounted in the casing to keep the shape of the casing and a support stand for supporting the shape keeping arrangement;

The said support stand includes a base board; and a pushing cylinder for lifting plates and a pressing cylinder which are centered about the center of the base board and sequentially positioned on the base board from inside to outside; a fixing ring for fixing the casing is provided at the periphery of the said pressing cylinder;

The said shape keeping arrangement includes a fixing cylinder containing the said pressing cylinder and a keeping cylinder for lifting plates positioned in the fixing cylinder which are set in centric circle form; A lifting plate capable of upward and downward movement is provided horizontally in the said keeping cylinder for lifting plates;

A fixing plate is in fixed connection with the upper end of the said fixing cylinder, a stanchion is positioned in the center of the said fixing plate, and several components keeping arrangement are provided at the periphery of the said stanchion; the said components keeping arrangement are formed by the connection of flexibly folded upper side components keeping arrangement and lower side components keeping arrangement, the upper end of the upper side components keeping arrangement are flexibly connected with the upper end of the stanchion, and a bar keeping arrangement which can move upward and downward in the holes keeping arrangement positioned in the fixing plate is positioned at the lower end of the said lower side components keeping arrangement.

In the above-mentioned solution, a guiding bar is positioned in the said pushing cylinder for lifting plates positioned on the base board, and a guiding cylinder for lifting plates into which the said guide bar can be inserted is positioned in the said keeping cylinder for lifting plates.

In the above-mentioned solution, a moving component capable of upward and downward movement is positioned on the said stanchion, the said upper side component keeping arrangement and the said moving component are connected via a connecting bar; a connecting component is positioned on the lower end of the said moving component, the said connecting component is fixed connection with the said moving component at one end and with the said lifting plate at the other end, and the said connecting component passes through the fixing plate and moves upward and downward together with the moving component.

In the above-mentioned solution, a spring is mounted between the said moving component and the said fixing plate.

In the above-mentioned solution, an auxiliary plate keeping arrangement is mounted in the said shape keeping arrangement, the said auxiliary plate keeping arrangement is formed by the connection of flexibly folded upper side auxiliary plate keeping arrangement and the lower side auxiliary plate keeping arrangement whose outer side is curved, the upper end of the said upper side auxiliary plate keeping arrangement is flexibly connected with the upper end of the stanchion, and a bar keeping arrangement which can move upward and downward in the holes keeping arrangement positioned in the fixing plate is positioned at the lower end of the said lower side auxiliary plate keeping arrangement.

Compared with the prior art, the technical solution of the present invention has the following beneficial effects:

1. The shape keeping arrangement of the present invention has a very simple structure, and it will expand to keep the shape of the casing when the shape keeping arrangement mounted in the casing is inserted into the supporting stand, and the shape keeping arrangement is simple to assemble.

2. The auxiliary component keeping arrangement in the shape keeping arrangement of the present invention can enable the shape keeping arrangement to accurately keep the shape in the casing, preventing the model surface from concave.

DETAILED DESCRIPTION OF THE PRESENTLY PREFERRED EMBODIMENTS

This invention will be further illustrated in combination with attached drawings and the following embodiments.

Figure 1:
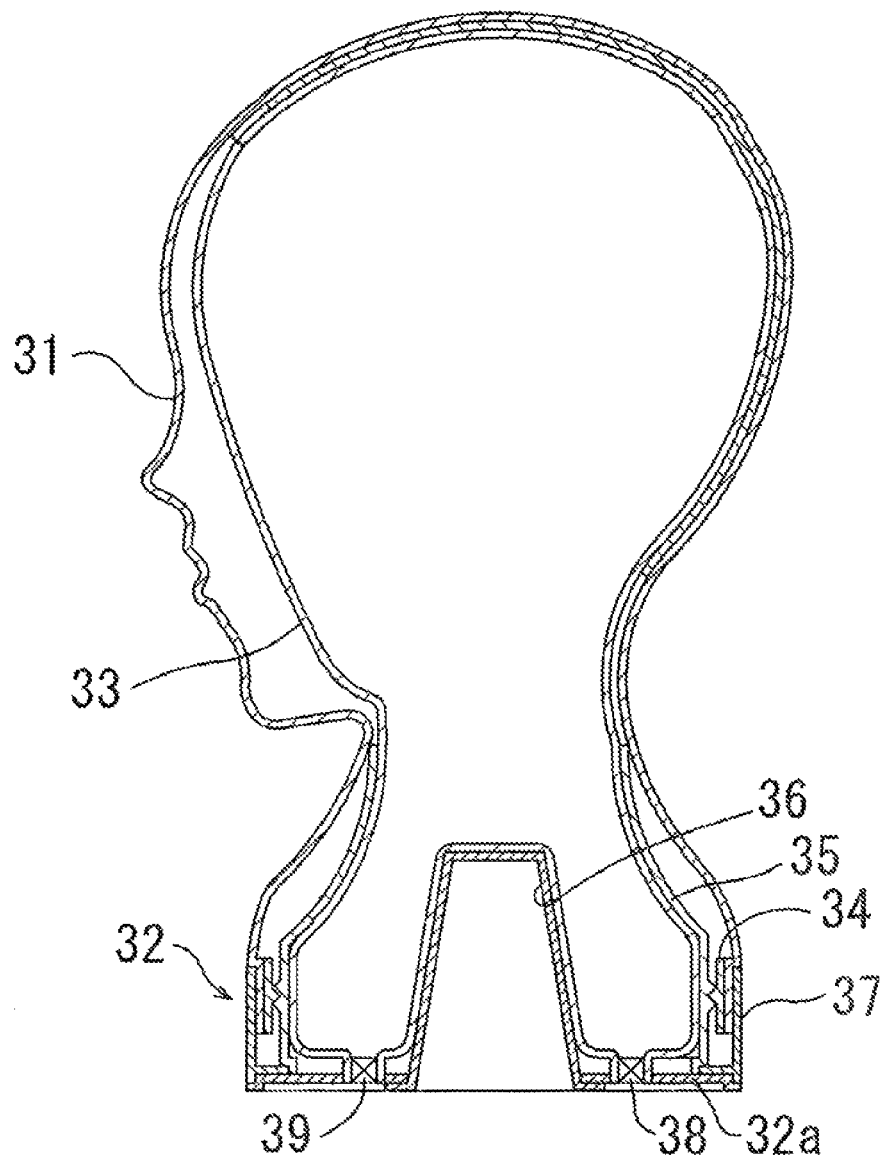
FIG. 1 is a cross-sectional view of the head model of the prior art.
Figure 2:
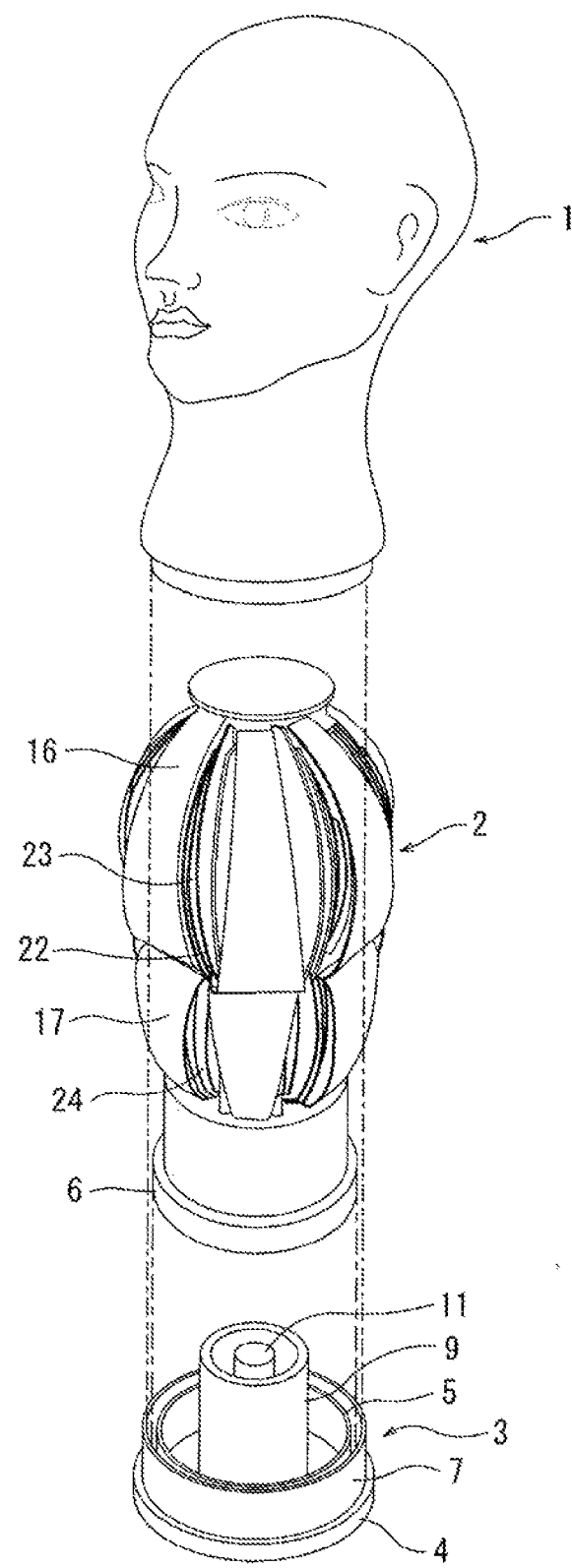
FIG. 2 is a decomposition side view of a teaching and training head model for haircutting and hairdressing in accordance with an embodiment of the present invention.
Figure 3:
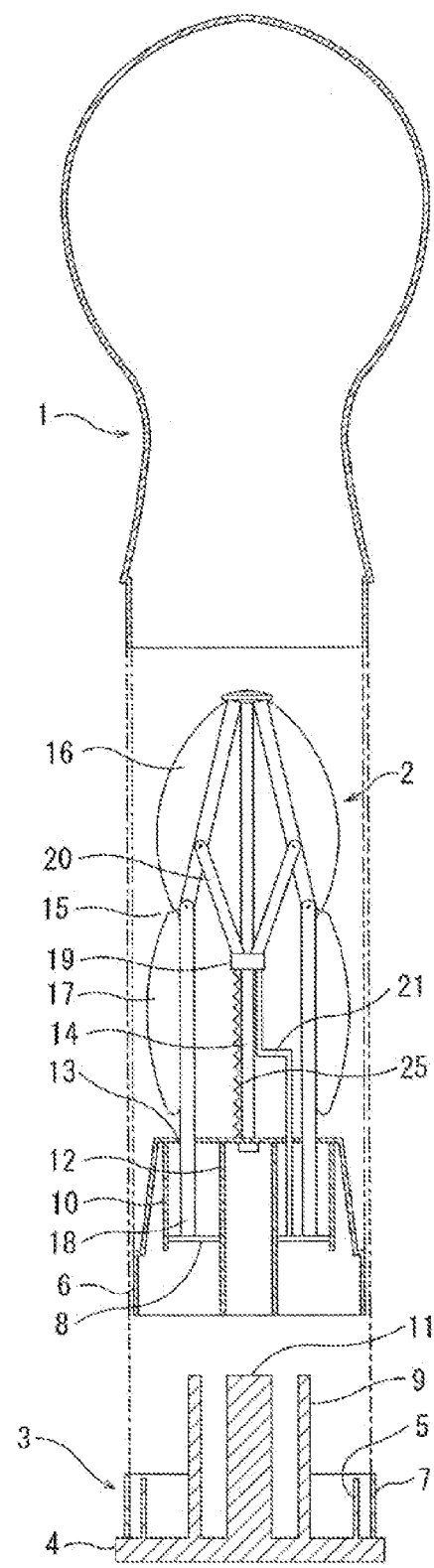
FIG. 3 is a decomposition cross-sectional view of a teaching and training head model for haircutting and hairdressing in accordance with an embodiment of the present invention.
Figure 4:
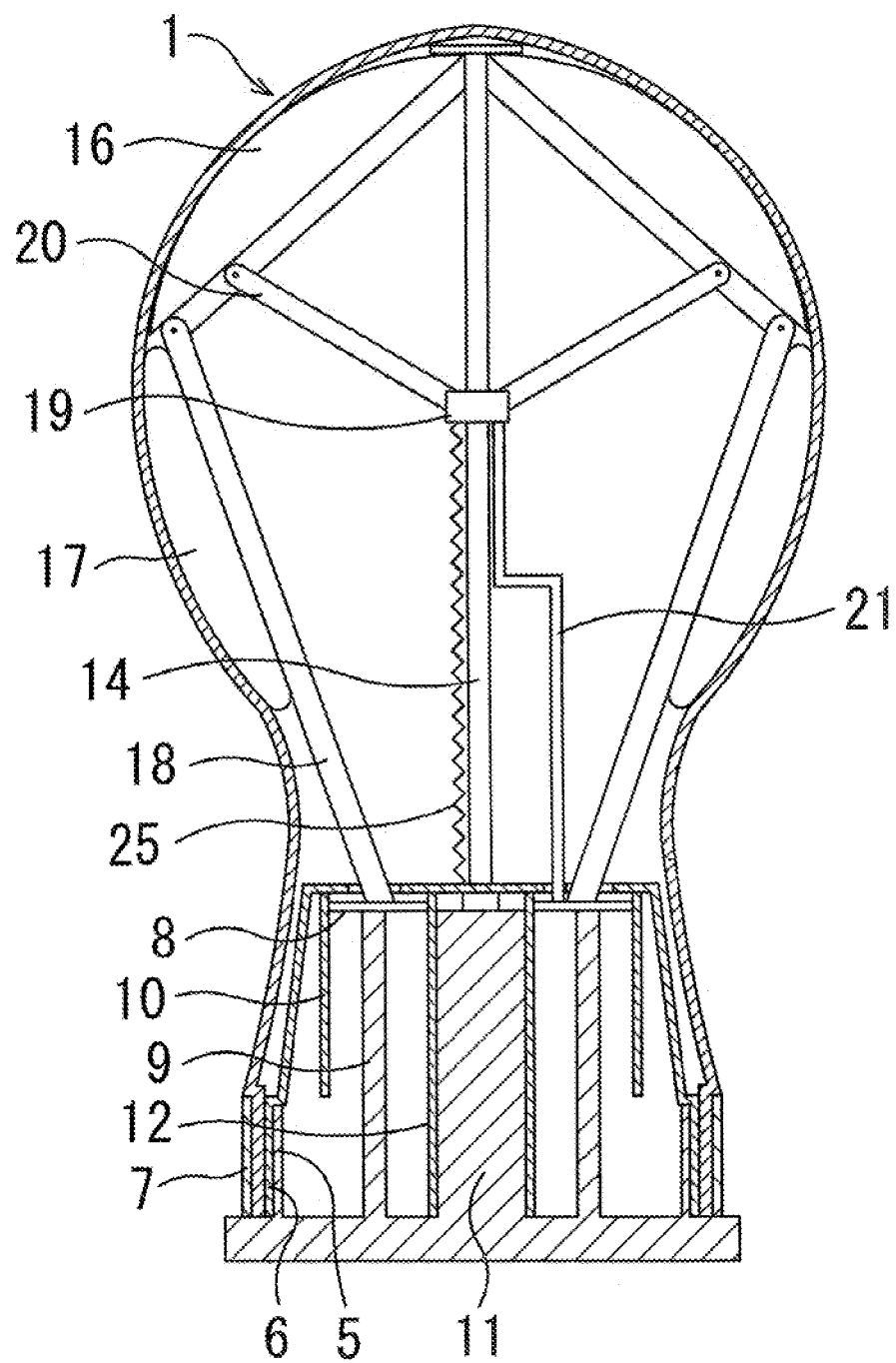
FIG. 4 is a cross-sectional view of an assembled teaching and training head model for haircutting and hairdressing in accordance with an embodiment of the present invention.

As shown in FIG. 2~FIG. 4, the present invention provides a teaching and training head model for haircutting and hairdressing, including a soft and flexible synthetic resin casing 1, a shape keeping arrangement 2 mounted in the casing 1 to keep the shape of the casing and a support stand 3 for supporting the shape keeping arrangement.

The casing 1 consists of soft and flexible synthetic resin such as PVC resin, and human hair or chemical fiber hair is implanted into the casing 1, and hair root is fixed at the inner side of the casing with glue.

The support stand 3 includes a base board 4; and a guiding bar 11, a pushing cylinder 9 for lifting plates and a pressing cylinder 5 which are centered about the center of the base board 4 and sequentially positioned on the base board 4 from inside to outside; A fixing ring 7 for fixing the casing 1 is provided at the periphery of the said pressing cylinder 5.

The shape keeping arrangement 2 includes a fixing cylinder 6 containing the pressing cylinder 5 and a guiding cylinder 12 for lifting plates into which the guiding bar 11 can be inserted, which are set in centric circle form. The keeping cylinder 10 for lifting plates is positioned between the fixing cylinder 6 and guiding cylinder 12 for lifting plates, and a lifting plate 8 capable of upward and downward movement is provided horizontally between the keeping cylinder 10 for lifting plates and the guiding cylinder 12 for lifting plates.

A fixing plate 13 is in fixed connection with the upper end of the fixing cylinder 6, a stanchion 14 is positioned in the center of the fixing plate 13, and six components keeping arrangement 15 are provided at the periphery of the stanchion 14. The components keeping arrangement 15 are formed by the connection of flexibly folded upper side components keeping arrangement 16 and lower side components keeping arrangement 17, the upper end of the upper side components keeping arrangement 16 are flexibly connected with the upper end of the stanchion 14, and a bar keeping arrangement 18 which can move upward and downward in the holes keeping arrangement positioned in the fixing plate 13 is positioned at the lower end of the lower side components keeping arrangement 17.

A moving component 19 capable of upward and downward movement is positioned on the stanchion 14, the upper side component keeping arrangement 16 and the moving component 19 are connected via a connecting bar 20; A connecting component 21 is positioned on the lower end of the moving component 19, the connecting component 21 is fixed connection with the moving component 19 at one end and with the lifting plate 8 at the other end, and the connecting component 21 passes through the fixing plate 13 and moves upward and downward together with the moving component 19; A spring 25 is mounted between the moving component 19 and the fixing plate 13, and the spring 25 can make the components keeping arrangement contract inward when the shape keeping arrangement separates from the support stand.

An auxiliary plate keeping arrangement 22 is mounted in the shape keeping arrangement 2, the auxiliary plate keeping arrangement 22 is formed by the connection of flexibly folded upper side auxiliary plate keeping arrangement 23 and the lower side auxiliary plate keeping arrangement 24 whose outer side is curved, the upper end of the upper side auxiliary plate keeping arrangement 23 is flexibly connected with the upper end of the stanchion 14, and a bar keeping arrangement 18 which can move upward and downward in the holes keeping arrangement positioned in the fixing plate 13 is positioned at the lower end of the said lower side auxiliary plate keeping arrangement 24.

In using the head model, place the casing 1 on the shape keeping arrangement 2 which is in a closed status, and the lower part of the casing 1 is outside of the fixing cylinder 6 of the shape keeping arrangement 2; insert the pressing cylinder 5 of the support stand 3 into the fixing cylinder 6 of the shape keeping arrangement 2, clamp the casing 1 between the fixing cylinder 6 and the fixing ring 7 via the fixing ring 7. When the pressing cylinder 5 of the support stand 3 is inserted into the fixing cylinder 6 of the shape keeping arrangement 2, the pushing cylinder 9 for lifting plates in the support stand will be guided by the guiding bar 11 and the guiding cylinder 12 for lifting plates to push up the lifting plate 8 capable of upward and downward movement in the shape keeping arrangement 2. After the lifting plate 8 is pushed up, it will push up the bar keeping arrangement 18 and the connecting component 21, the bar keeping arrangement 18 will support and expand the lower side component keeping arrangement 17, the connecting component 21 will bring the moving component 19 to move up, and the moving component 19 will enable the connecting bar 20 to support and expand the upper side component keeping arrangement 16; meanwhile, the auxiliary plate keeping arrangement 22 will unfold to keep the shape of the sites of the casing 1 which are not touched by the shape keeping arrangement 2 in expansion. Thus, the shape of the casing 1 will be accurately kept.

The teaching and training head model for haircutting and hairdressing of the present invention is characterized by simple structure and easy assembly. It adopts a mechanical joint structure and can accurately keep the external shape designed according to the head model; meanwhile, the present invention needs no large space for storage, brings feel of true human skin, produces no much refuse when discarded, and is a reusable head model for haircutting and hairdressing.

The above-mentioned embodiment is used for the further detailed description of the purpose, technical solution and beneficial effect of the present invention. It should be understandable that the above-mentioned is only preferred embodiment of the present invention and shall not be used to limit the present invention. Any modification, equivalent replacement and improvement within the spirit and principle of the present invention shall be considered within the protection scope of the present invention.

What is claimed is:

1. A teaching and training head model for haircutting and hairdressing, including a casing, a shape keeping arrangement mounted in the casing to keep the shape of the casing and a support stand for supporting the shape keeping arrangement; wherein the said support stand includes a base board; and a pushing cylinder for lifting plates and a pressing cylinder which are centered about the center of the base board and sequentially positioned on the base board from inside to outside; a fixing ring for fixing the casing is provided at the periphery of the said pressing cylinder;

the said shape keeping arrangement includes a fixing cylinder containing the said pressing cylinder and a keeping cylinder for lifting plates positioned in the fixing cylinder which are set in centric circle form; a lifting plate capable of upward and downward movement is provided horizontally in the said keeping cylinder for lifting plates; and a fixing plate is in fixed connection with the upper end of the said fixing cylinder, a stanchion is positioned in the center of the said fixing plate, and several components keeping arrangement are provided at the periphery of the said stanchion; the said components keeping arrangement are formed by the connection of flexibly folded upper side components keeping arrangement and lower side components keeping arrangement, the upper end of the upper side components keeping arrangement are flexibly connected with the upper end of the stanchion, and a bar keeping arrangement which can move upward and downward in the holes keeping arrangement positioned in the fixing plate is positioned at the lower end of the said lower side components keeping arrangement.

2. The head model of claim 1, wherein a guiding bar is positioned in the said pushing cylinder for lifting plates positioned on the base board, and a guiding cylinder for lifting plates into which the said guide bar can be inserted is positioned in the said keeping cylinder for lifting plates.

3. The head model of claim 1, wherein a moving component capable of upward and downward movement is positioned on the said stanchion, the said upper side component keeping arrangement and the said moving component are connected via a connecting bar; a connecting component is positioned on the lower end of the said moving component, the said connecting component is in fixed connection with the said moving component at one end and with the said lifting plate at the other end, and the said connecting component passes through the fixing plate and moves upward and downward together with the moving component.

4. The head model of claim 1, wherein a spring is mounted between the said moving component and the said fixing plate.

5. The head model of claim 1, wherein an auxiliary plate keeping arrangement is mounted in the said shape keeping arrangement, the said auxiliary plate keeping arrangement is formed by the connection of flexibly folded upper side auxiliary plate keeping arrangement and the lower side auxiliary plate keeping arrangement whose outer side is curved, the upper end of the said upper side auxiliary plate keeping arrangement is flexibly connected with the upper end of the stanchion, and a bar keeping arrangement which can move upward and downward in the holes keeping arrangement positioned in the fixing plate is positioned at the lower end of the said lower side auxiliary plate keeping arrangement.

* * * * *